R. Leschot,
Rock Drill.
No. 3304. Reissued Feb. 16. 1869.
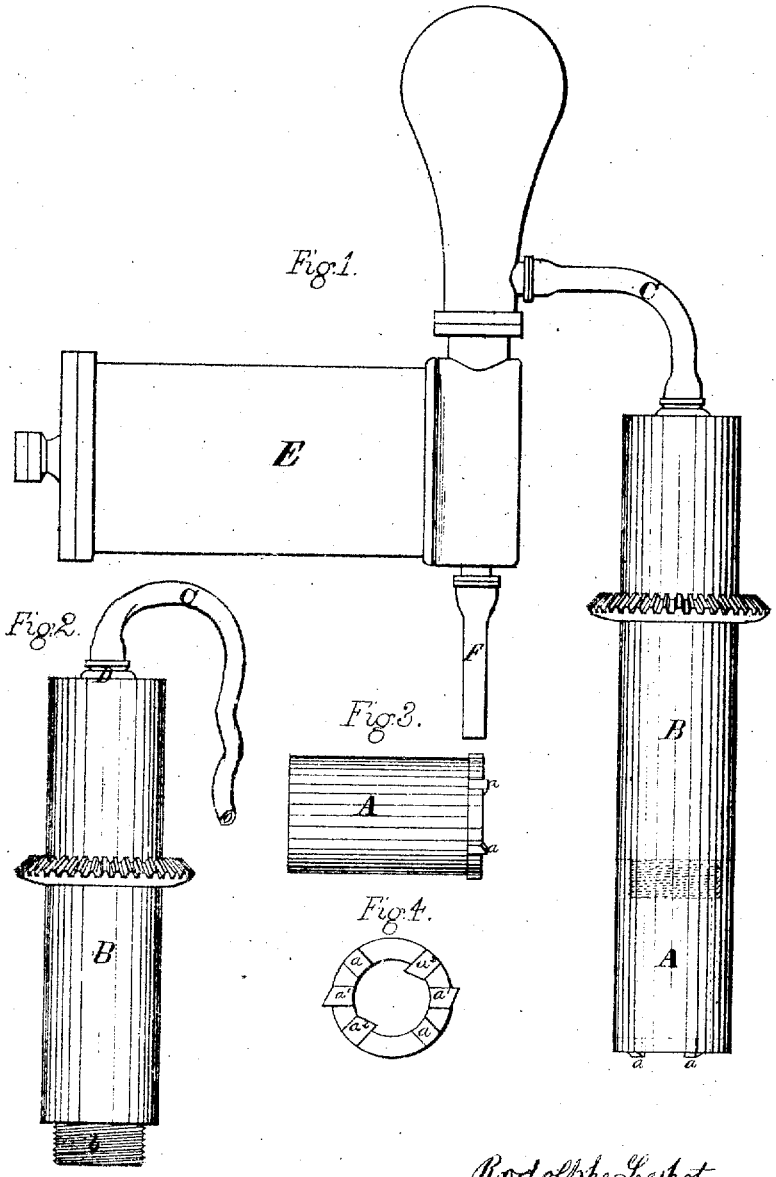
Witnesses
John A. Lewis
Wm. T. Holt.
Rodolphe Leschot. Inventor
T. J. Severance Assignee
by
T. H. Alexander Atty.

United States Patent Office.

ASAHEL J. SEVERANCE, OF MIDDLEBURY, VERMONT, ASSIGNEE, BY MESNE ASSIGNMENTS, OF RODOLPHE LESCHOT.

*Letters Patent No.* 39,235, *dated July* 14, 1863; *reissue No.* 3,304, *dated February* 16, 1869.

IMPROVED ROCK-DRILL.

The Schedule referred to in these Letters Patent and making part of the same.

Be it known that RODOLPHE LESCHOT, of Paris, in the Empire of France, has invented a new and improved Drill, or Tool for the Boring of Rocks and other hard substances; and I, ASAHEL J. SEVERANCE, of Middlebury, in the State of Vermont, assignee of said invention, do hereby declare the following to be a full, clear, and exact description of the same, reference being had to the accompanying drawings, forming part of this specification, in which—

Figure 1 is a side view of said tool, with its hose, or water-pipe and pump connected therewith, but detached from the gears and rotating-machinery by which the same is operated;

Figure 2 is a side view of the boring-bar, or tubular stock of said drill, with its crown or boring-head detached;

Figure 3 is a side view of the crown or boring-head; and

Figure 4 is a front view of the same.

Similar letters of reference indicate corresponding parts in all the figures.

Heretofore the boring or drilling of rocks has been generally accomplished by means of a chisel, punch, or boring-bar, operated by percussion.

This invention consists in a drill, or boring-tool, composed of a short hollow cylinder of steel or other metal, (called the crown or boring-head,) armed at one end with a series of cutting-edges, or teeth, composed of diamonds, or other hard substances, and attached, at its other end, to a cylindrical boring-bar, of iron or other metal, made hollow, for the purposes hereinafter set forth.

To this boring-bar, with its crown or boring-head attached, is imparted, by any suitable apparatus, a combined rotary and forward motion, which causes the tool to cut an annular groove or channel in the rock or other substance upon which it is employed, leaving a central core, in the form of a solid cylinder, which is easily detached by the subsequent operation of a clasp-spoon or gad.

While the tool is in operation, a stream of water is forced through the hollow boring-bar and crown, into the hole which is being bored, in order to keep the tool from heating, and to wash out and carry away the detritus which might otherwise impede its action.

The advantages of this tool are, that it necessitates the cutting or detrition of but very little matter, compared with the size of the hole produced; that it bores the hardest rocks with great rapidity; that it effectually removes from the hole which is being bored the chips or borings as fast as produced; that it affords a cheap and expeditious method of testing the character and value of mines and quarries at great depths; that it may be operated with but little power, and does not wear out by long use.

To enable others skilled in the art to make and use this invention, I will proceed to describe it with reference to the drawings.

A is the short hollow cylinder, of steel or other metal, (called the crown or boring-head,) and $a$ $a^1$ $a^2$ are the cutting-edges or teeth, composed of diamonds or other hard substances, set firmly into suitable notches or mortises in the face of said crown.

These diamonds are such as, from their color, are least valuable for jewelry. They are respectively so arranged in the face of said crown A, that the cutting-edges of some project in a forward direction from the front end of said crown, as illustrated by $a$ $a$, while the edges of others project outwardly from the outer periphery thereof, as illustrated by $a^1$ $a^1$, and the edges of others project inwardly from the inner periphery, as illustrated by $a^2$ $a^2$.

This crown or boring-head is secured at $b$ by a bayonet-fastening, screw, or other suitable and convenient means, to the tubular boring-bar B, figs. 1 and 2, of any suitable length, whose outer diameter is not greater than that of the said crown, and whose inner diameter is not less than that of said crown; and this bar is furnished with the requisite mechanical appliances, or otherwise made to form part of a machine of suitable construction, whereby it has imparted to it both a rotary and direct forward or feeding-motion, which causes its crown to bore an annular hole in the rock or other hard substance upon which it operates.

In order to prevent the tool from heating while in operation, and to remove the detritus which it produces, without suspending its action, a stream of water may be forcibly injected into the hole which is being bored, through the tubular boring-bar and crown, by means of an ordinary force-pump, E, or other apparatus, which injects the same by applying thereto a mechanical pressure.

This forcing-pump, or other machine for throwing in the water, is connected by a hose, or water-pipe, C, figs. 1 and 2, with the outer or rear end of the tubular boring-bar B, as shown at D, in such a manner that the same is not twisted by the operation of said bar.

Through this hose or pipe a rapid stream of water, driven by the pump or forcing-apparatus E, is supplied to the inside of the hollow drill-stock B, from which it can escape only through the crown or boring-head A, where it rushes out with great force, thereby keeping the same cool, and effectually washing out and carrying away, in its rapid flow, all the chips or borings, as fast as produced.

By this means, I am enabled to bore a hole many hundred feet deep in the solid rock, in either a vertical, horizontal, or oblique direction, without experiencing any trouble or delay on account of the accumulation of the detritus.

When the boring has been continued to a desirable depth, the boring-bar, with its crown attached, is drawn out from the hole, and the cylindrical core which has been left in the hole, and which, as the boring progressed, passed through the crown into the tubular bar, is broken off at or near the bottom of the hole, and drawn out by means of a clasp-spoon, or other suitable instrument, leaving a cylindrical hole, of a diameter equal to that of the circle described by the revolution of the diamond cutters $a^1$ $a^1$.

If, in any case, it is not deemed desirable to produce the central core or cylinder in boring, a crown or boring-head may be used, of similar construction with the one herein described, but having the tubular opening in its cutting-end closed up with a solid plug of steel or other metal, made either concave or convex in form, and having a series of cutting-edges attached thereto, and so arranged in the face thereof, that the circles which they describe, as the tool revolves, shall overlap each other, and so cut out the whole width of the hole.

This plug is perforated with small holes, for the emission of the water.

The same kind of tool, made of suitable calibre, may be used for the production of solid cylindrical columns of stone, marble, &c., for architectural purposes, the columns being produced substantially in the same way with the core before mentioned.

This tool may also be used for the manufacture of hollow cylinders, or tubes, of stone, for draining-purposes, &c., of any desired length and diameter, by first producing a large, solid cylinder, or column, as above described, and then, by the use of these tools, of different sizes, boring out from this column a number of cores, or solid cylinders, in succession, each successive one being smaller than the preceding, and the difference in the respective diameters of which, less the thickness of one side of the tubular boring-bar, will be equal to the thickness of the sides of the tubes, or hollow cylinders, produced.

But it is for the mining of all kinds of ores, and the opening of roads and canals through rocky countries, and the drilling of submarine ledges, that this tool is most valuable.

I commonly so construct these boring-machines that the same small portable steam-engine which rotates the drill operates the pump also; and I am thus enabled to make them sufficiently compact to work freely, when desired, in a mining-drift or tunnel three feet high, while, by means of the force-pump E, I draw the water from any convenient distance, through the pipe or hose F; and, if the same be scarce, or difficult to obtain, as is often the case in mountain-mines, I lay a spout from the surface of the hole to a small tank, or cistern, placed near by, to convey back the water as fast as it gushes out of the hole, and so use the same water over and over again, with but little loss.

I have not set forth in my drawings, the mechanical apparatus by which this drill is rotated, as I do not claim any particular form of rotating-machinery as part of this invention; nor have I described the construction and operation of the force-pump E, since I use any of the ordinary forms of force-pumps indifferently, in combination with this drill, only adapting the power of the water-forcing machinery to the depth and size of the holes to be bored.

No claim is made to the use of diamonds for fashioning stone, as set forth in the French patents of M. Herman and Bigot Dumaine; nor do I claim the passage of water through a drill, by means of a siphon, as shown in the English patent of Robert Beart; but

What I claim as the invention of LESCHOT, and desire to secure by Letters Patent, is—

1. A hollow rotating rock-drill, composed of a tubular boring-bar, B, and a cylindrical crown or boring-head, A, armed with diamond or other teeth, $a$ $a^1$ $a^2$, when said drill is used in combination with a force-pump, E, and connected with rotating-machinery, substantially as and for the purposes set forth.

2. The use of a stream of water, when it is forced through a hollow rock-drill by means of a force-pump or other apparatus, which operates upon the same by means of mechanical pressure, substantially as and for the purposes set forth.

ASAHEL J. SEVERANCE.

Witnesses:

W. S. HOLT,

J. V. WHITE.